Figure 1:
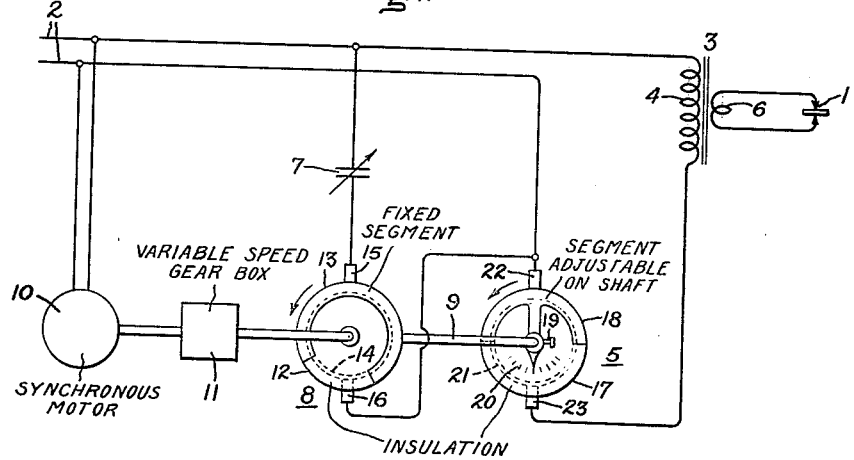

Inventor:
Louis G. Levoy, Jr.
by Harry E. Dunham
His Attorney.

Patented Aug. 27, 1940

2,213,090

UNITED STATES PATENT OFFICE 2,213,090

ELECTRIC TRANSLATING CIRCUIT

Louis G. Levoy, Jr., Schenectady, N. Y., assignor to General Electric Company, a corporation of New York Application November 30, 1939, Serial No. 306,996

8 Claims. (Cl. 172—246)

My invention relates to electric translating circuits and more particularly to an electric circuit for supplying an intermittent or pulsating load of low power factor from an alternating-current circuit.

Where an intermittent or pulsating load is imposed on an alternating-current circuit and where the load circuit or the associated translating apparatus includes inductive devices, the starting operations and the intermittent pulsations impose low power factor conditions on the supply circuit. One of the limitations at the present time on resistance welding machines both in size and number is the large intermittent kv.-a. demand at low power factor which imposes a difficult load on the power system both from the standpoint of feeder regulation and capacity. Furthermore, large objectionable starting transients result, giving rise to "flicker" of the lighting load. In many locations, the power companies cannot serve large resistance welding machines because of the small revenue and high installed capacity required to serve them or because of the "flicker" problem. A large part of the power company's difficulty would be eliminated if it were feasible to correct the power factor to approximately unity, so that the power system would have to supply only the energy component of the load. The merits of power factor correction have been recognized for a long time and various arrangements have been devised heretofore for correcting these low power factor operating conditions and objectionable starting transients. For example, shunt capacitors have been used successfully in connection with constant load applications. However, in resistance welding machines, the problem of power factor correction problems in that the load is of a highly intermittent nature. The amount of inrush current to a shunt capacitor each time the welder is energized may be several times the normal welder inrush depending upon the phase angle of the closure of the circuit. It has, therefore, been proposed to eliminate the inrush charging current by precharging the shunt capacitor. One arrangement for accomplishing this is disclosed and claimed in my copending application Serial No. 290,602, filed August 17, 1939.

It is an object of my invention to provide a new and improved electric translating circuit for improving the power factor imposed on an alternating-current supply circuit where the load is of an intermittent or pulsating nature.

It is a further object of my invention to provide an electric circuit wherein a low power factor device may be supplied intermittently or continuously from an alternating-current circuit in such a manner that the alternating-current circuit furnishes substantially only energy or in-phase current although the load circuit may be operating at a low power factor.

It is another object of my invention to provide an electric translating apparatus for improving the power factor and coincidentally substantially eliminating transient starting currents.

Further objects and advantages of my invention will become apparent as the folowing description proceeds and the features of novelty which characterize my invention will be pointed out with particularity in the claims annexed to and forming a part of this specification.

In accordance with my invention, I provide a new and improved electric circuit for effecting the energization of an intermittent or pulsating load circuit of low power factor whereby it is possible to eliminate substantially or entirely the transient current conditions as well as to substantially improve the power factor of the apparatus as a whole.

Figure 2:
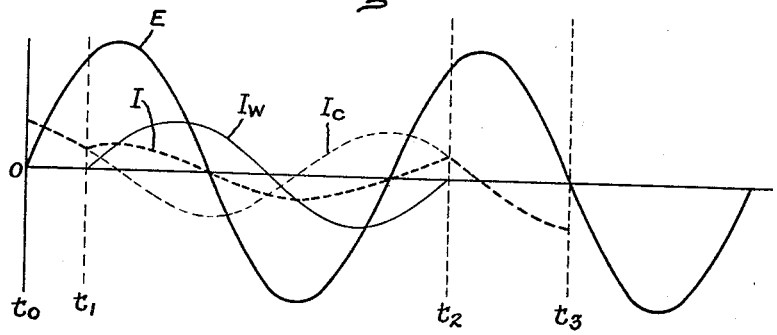
Figure 3:
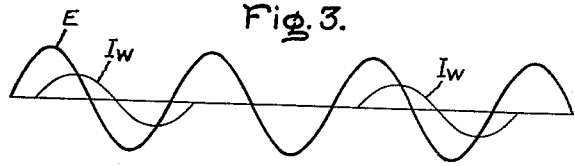

The novel features which I believe to be characteristic of my invention are set forth with particularity in the appended claims. My invention itself, however, will best be understood by reference to the following drawing in which Fig. 1 diagrammaticaly represents an embodiment of my invention, while Figs. 2 and 3 illustrate certain operating characteristics of the apparatus illustrated in Fig. 1 in order to aid in the understanding of the invention.

Referring now to Fig. 1 of the accompanying drawing, my invention is diagrammatically illustrated as applied to an apparatus for effecting energization of a load circuit such as welding circuit 1 from an associated alternating-current supply circuit 2. A transformer 3 may be employed to effect energization of the welding circuit 1. The primary winding 4 of the transformer 3 is connected across the alternating-current supply circuit 2 through a synchronous switch 5 while the secondary winding 6 of transformer 3 is connected to the welding circuit 1. Owing to the small voltage and large volume of current on the secondary winding 6 of transformer 3, primary winding 4 includes a large inductive reactance. This inductive reactance causes the current in the primary circuit of transformer 3 to lag excessively behind the voltage applied to the primary so that the machine has a very low power factor, in practice frequently below fifty per cent.

In order to improve the power factor of the welding apparatus, I provide a variable capacitance 7 connected in parallel with the primary winding 4 of transformer 3 through a synchronous switch 8. Capacitance 7 is adjusted so that the capacitative reactance thereof is such as to neutralize the inductive reactance of the transformer 3 whereby the alternating-current supply circuit 2 is required only to supply a resistance load and, hence, theoretically the current and voltage of supply circuit 2 are in phase.

Since welding circuit 1 is in operation only a portion of the time, the regulation, i. e., flicker, etc., of the load circuit would not be improved by continually connecting capacitor 7 across supply circuit 2. Accordingly, synchronous switch 8 is provided which is mounted on the same shaft 9 as synchronous switch 5 for controlling the intermittent operation of welding circuit 1. Synchronous switches 5 and 8 are driven synchronously with the supply circuit 2 by means of synchronous motor 10, through a variable speed gear box 11 by means of which the intermittent operation of the load circuit may be controlled. Synchronous switch 8 comprises a rotating commutator 12 of insulating material including a conducting segment 13. Rotating commutator 12 is fixedly attached to shaft 9. A slip ring 14 is associated with commutator 12 and electrically connected with conducting segment 13. A plurality of brushes 15 and 16 completes the electrical circuit trough synchronous switch 8. Brush 15 rides along the circumference of commutator 12 while brush 16 is adapted to engage slip ring 14. Synchronous switch 5 is similar to synchronous switch 8 and includes a rotating commutator 17 also fixedly attached to shaft 9. Commutator 17, which is constructed of insulating material, is provided with a conducting segment 18 which is adjustably mounted with relation to commutator 17 and commutator 12. A set screw 19 is provided for holding this adjustable segment in the desired angular position. In order to indicate the anglar position of adjustable segment 18 with respect to commutators 12 and 17, suitable indicia 20 are provided on commutator 17. Synchronous switch 5 also includes a slip ring 21 electrically connected with adjustable conducting segment 18. A plurality of brushes 22 and 23 are also provided. Brush 22 is mounted so as to ride on the circumference of commutator 17 while brush 23 is associated with slip ring 21.

Although I have illustrated a variable speed gear box by means of which the welding operation may be controlled, it will be understood by those skilled in the art that the commutator segments 13 and 18 may be adjustable in so far as their angular extent with relation to commutators 12 and 17, respectively, is concerned, or both the variable speed gear box and the variable length conducting segments may be provided for greater flexibility in regard to the operation of the load circuit 1. However, in the particular embodiment shown, I have illustrated the apparatus for a particular welding operation as best shown in Fig. 3 where E represents the voltage of supply circuit 2 as well as the voltage across the primary winding 4 of transformer 3 during the conducting interval and $I_w$ represents the welding current flowing through the primary winding 4 of transformer 3. It will be observed from Fig. 3 that, in the particular arrangement illustrated, the apparatus is set for a welding operation wherein the weld is on for one cycle and off for one cycle.

The operation of the embodiment of my invention, shown in Fig. 1, will be explained with reference to Fig. 2 wherein E represents the voltage of supply circuit 2 and, of course, also the voltage across the capacitor 7 and across the primary winding 4 of transformer 3 when synchronous switches 5 and 8 are in their closed positions; $I_w$ represents the welding current flowing through primary winding 4 of transformer 3; $I_c$ represents the current flowing through capacitor 7, and I represents the current supplied from power supply circuit 2. The currents I, $I_w$ and $I_c$ are, of course, intermittent in view of the intermittent operation of the welding circuit 1. It will be assumed that supply circuit 2 is a sixty-cycle circuit and that synchronous motor 10 rotates at 3600 R. P. M. Similarly, the ratio of the gears in the variable speed gear box is adjusted with a two one ratio so that synchronous switches 5 and 8 rotate at 1800 R. P. M. or, in other words, rotate once for every two cycles of alternating-current supply circuit 2. With respect to the welding cycle chosen for explaining the operation of my invention synchronous switches 5 and 8 rotate once for each welding cycle. The direction of rotation of synchronous switches 5 and 8 is illustrated by the arrows in Fig. 1.

The conducting segment 13 of synchronous switch 12 is arranged to close the circuit through the capacitor 7 at the zero point of the voltage wave prior to the time that the welding circuit 1 is energized. By this arrangement, large inrush currents to the capacitor are reduced to a finite value as may be observed from the fundamental relationship expressed by the following equation:

$$I_c = C\frac{dE}{dt}$$

where C is the capacitance of capacitor 7 and $dE/dt$ is the slope of the voltage wave E of Fig. 2. Closure at the zero point of the voltage wave E makes $dE/dt$ finite and, hence, the minimum inrush current to capacitor 7 will result since, at any other point of closure of the capacitance circuit, the inrush current will tend to be infinite, (limited only by line impedance) thereby causing serious disturbances and undesirable light "flicker." Accordingly, synchronous switch 8 is arranged to close the capacitor circuit at the zero point of the voltage wave of supply circuit 2. Assuming that the welder has a fifty per cent power factor, the welding current will lag the voltage by sixty electrical degrees. Accordingly, sixty electrical degrees later after the capacitance 7 has been connected across supply circuit 2, conducting segment 18 of synchronous switch 5 makes contact with brush 22, thereby closing the welding circuit at the zero point of the welding current wave in so far as steady state conditions are concerned. The time of closing the capacitor circuit through synchronous switch 8 is represented by $t_0$ in Fig. 2 while, sixty electrical degrees later at time $t_1$, the welding circuit is closed through synchronous switch 5. The welding circuit remains energized for one cycle, after which contact 18 breaks contact with brush 22 at $t_2$ in Fig. 2, thereby opening the welding circuit at current zero. One hundred and twenty electrical degrees later or at the next zero point of the voltage wave represented by $t_3$ in Fig. 2, synchronous switch 8 opens the capacitor circuit. Segment 18 of synchronous switch 5 may, of course, be adjusted relative to synchronous switch 8, depending upon the power factor of the welding circuit. After the welder has remained unenergized for one cycle, the process is repeated with the capacitor always being connected to the supply circuit at the zero point of the voltage wave preceding the energization of the welder by the power factor angle. By this arrangement the power factor of the welder is substantially improved while the undesirable transients are eliminated or substantially reduced without providing a complicated precharging circuit for the capacitor. Of course, it will be understood by those skilled in the art that my invention may also be used where a precharging circuit for the capacitor is provided, in which case some modification of the operation of the synchronous switches will be necessary.

Although I have illustrated my invention as including a plurality of synchronous switches or contactors, it will be understood by those skilled in the art that these synchronous switches might be replaced by synchronously operated magnetic contactors or other types of switches or by electric discharge valves functioning in substantially the same manner. It will also be understood by those skilled in the art that variations of a few electrical degrees in the operation of synchronous switches 5 and 8 will be permissible since the inrush current is proportional to the voltage ordinate at the point of closing the switch.

It will also be understood by those skilled in the art that a particular embodiment of my invention has been illustrated and a particular operating characteristic described in order to fully explain the invention but many changes could be made in the welding cycle for example without departing from my invention.

While I have shown and described my invention as applied to a particular system of connections and as embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an alternating-current supply circuit, a load circuit, a transformer connected to said load circuit, a capacitance for improving the power factor of said load circuit, means for connecting said capacitance to said supply circuit at substantially voltage zero of said supply circuit, and means for connecting said transformer to said supply circuit subsequently to the operation of said first mentioned means by an interval of time corresponding to the power factor angle of said load circuit.

2. In combination, an alternating-current supply circuit, a load circuit, a transformer connected to said load circuit, circuit-controlling means for connecting said transformer to said supply circuit, and means for eliminating or substantially reducing the current transients upon energization of said load circuit comprising a capacitance, means for connecting said capacitance to said supply circuit at the voltage zero of said supply circuit and at a time preceding the operation of said circuit-controlling means by an increment corresponding to the power factor angle of said load circuit.

3. In combination, an alternating-current supply circuit, a highly reactive load circuit connected to said supply circuit, a capacitance for improving the power factor of said load circuit, synchronous switching means for connecting said capacitance to said supply circuit at a zero point of the voltage wave, and synchronous switching means for subsequently connecting said transformer to said supply circuit at the point on the voltage wave where the load current would be zero in steady state operation.

4. In combination, an alternating-current supply circuit, a low power factor intermittent operating load circuit, circuit-controlling means for intermittently connecting said load circuit to said supply circuit, means for improving the power factor of said load circuit comprising a capacitance, means for connecting said capacitance to said supply circuit, and means for operating said circuit-controlling means and said last mentioned means in synchronism with said supply circuit to connect said capacitance to said supply circuit at the voltage zero of said supply circuit and to connect said load circuit subsequently thereto at the steady state current zero of said load circuit whereby the current transients occurring upon the energization of said load circuit are eliminated or substantially reduced.

5. In combination, an alternating-current supply circuit, a low power factor load circuit, reactance means for improving the power factor of said load circuit, means for connecting said reactance means to said supply circuit at substantially voltage zero of said supply circuit, and means for connecting said load circuit to said supply circuit subsequently to the operation of said means for connecting said reactance means to said supply circuit by an interval of time corresponding to the power factor angle of said load circuit.

6. In combination, an alternating-current supply circuit, a load circuit, a translating device connected to said load circuit of the type producing a low power factor on said load circuit, a reactance device for improving the power factor of said load circuit, circuit-controlling means for connecting said translating device to said supply circuit, circuit-controlling means for connecting said reactance device to said supply circuit, and means for operating both said circuit-controlling means in synchronism with said alternating-current supply circuit so that said reactance device is connected across said supply circuit at the voltage zero thereof and said load circuit is energized subsequently to the energization of said reactance device by an increment of time corresponding to the power factor angle of said load circuit whereby transient current conditions are eliminated or substantially reduced.

7. In combination, an alternating-current supply circuit, a load circuit, a translating device connected to said load circuit of the type producing a low power factor on said load circuit, a reactance device for improving the power factor of said load circuit, circuit-controlling means for connecting said translating device to said supply circuit, circuit-controlling means for connecting said reactance device to said supply circuit, and means for operating both said circuit-controlling means in synchronism with said alternating-current supply circuit so that said reactance device is connected across said supply circuit at the voltage zero thereof and said load circuit is energized subsequently to the energization of said reactance device by an increment of time corresponding to the power factor angle of said load circuit, said last mentioned means being so constructed and arranged as to disconnect said translating device from said supply circuit at the current zero of said translating device at the end of one intermittent operation thereof and to subsequently disconnect said reactance device from said supply circuit at the succeeding voltage zero of said supply circuit.

8. In combination, an alternating-current supply circuit, a low power factor load circuit, reactance means for improving the power factor of said load circuit, synchronous switching means for connecting said reactance means to said supply circuit at the zero point of the voltage wave, and synchronous switching means for connecting said load circuit to said supply circuit at the current zero of said load circuit subsequently to the connection of said reactance means to said supply circuit, both said synchronous switching means comprising a commutator including a conducting segment, at least one of said conducting segments being angularly adjustable to provide for different power factor loads.

LOUIS G. LEVOY, Jr.

CERTIFICATE OF CORRECTION.

Patent No. 2,213,090.  August 27, 1940.

LOUIS G. LEVOY, JR.

It is hereby certified that error appears in the printed specification of the above numbered patent requiring correction as follows: Page 1, first column, line 37, after the word "correction" insert --is unusual as compared with ordinary power factor correction--; and second column, line 11, for "folowing" read --following--; page 2, first column, line 30, for "trough" read --through--; and that the said Letters Patent should be read with this correction therein that the same may conform to the record of the case in the Patent Office.

Signed and sealed this 15th day of October, A. D. 1940.

Henry Van Arsdale,
Acting Commissioner of Patents.

(Seal)